(12) United States Patent
Muniswamy et al.

(10) Patent No.: US 10,523,499 B2
(45) Date of Patent: Dec. 31, 2019

(54) MASTER CONTROLLER SELECTION IN A SOFTWARE DEFINED NETWORK

(71) Applicant: Hewlett Packard Enterprise Development LP, Houston, TX (US)

(72) Inventors: Kalaiponni Muniswamy, Bangalore (IN); Leena Chandar Chandrasekaran, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 283 days.

(21) Appl. No.: 15/706,858

(22) Filed: Sep. 18, 2017

(65) Prior Publication Data

US 2018/0091366 A1    Mar. 29, 2018

(30) Foreign Application Priority Data

Sep. 20, 2016 (IN) .............................. 201641032071

(51) Int. Cl.
*H04L 12/24* (2006.01)
*H04L 29/08* (2006.01)
*H04L 29/14* (2006.01)

(52) U.S. Cl.
CPC .......... *H04L 41/0803* (2013.01); *H04L 41/12* (2013.01); *H04L 41/0663* (2013.01);
(Continued)

(58) Field of Classification Search
CPC .... H04L 41/12; H04W 56/009; H04W 12/06; G06F 21/31
See application file for complete search history.

(56) References Cited

U.S. PATENT DOCUMENTS 9,047,129 B2   6/2015 Pack
9,065,768 B2 * 6/2015 Luo ......................... H04L 45/42
(Continued)

FOREIGN PATENT DOCUMENTS

CN       105207856 A    12/2015

OTHER PUBLICATIONS

Jorge Baranda et al., "Applying Backpressure to Balance Resource Usage in Software-Defined Wireless Backhauls," Dec. 28, 2015, pp. 1-6, Centre Tecnol'ogic de Telecomunicacions de Catalunya (CTTC), Castelldefels (Barcelona), Spain.
(Continued)

*Primary Examiner* — Ranodhi Serrao
(74) *Attorney, Agent, or Firm* — Hewlett Packard Enterprise Patent Department

(57) ABSTRACT

Examples disclosed herein relate to selection of a master controller in a software defined network (SDN). In an example, a master controller may monitor a parameter on each SDN controller in a team of SDN controllers comprising the master controller, wherein the master controller performs a role of master over a group of network devices. In response to a determination that a value of the parameter on the master controller is above a pre-defined limit, master controller may select another SDN controller from the team. Master controller may assign the role of master over network devices in the group to the selected SDN controller based on a ranking of the network devices, wherein the network devices may be assigned in succession until a limit defined for a value of the parameter on the selected SDN controller is reached.

12 Claims, 5 Drawing Sheets

(52) U.S. Cl.
CPC ...... *H04L 41/0668* (2013.01); *H04L 67/1095* (2013.01); *H04L 69/40* (2013.01)

(56) References Cited

U.S. PATENT DOCUMENTS

| | | | | |
|---|---|---|---|---|
| 9,397,917 | B2* | 7/2016 | Li | ........................ H04L 41/0823 |
| 9,432,252 | B2* | 8/2016 | Koponen | ............ H04L 41/0695 |
| 10,218,564 | B2* | 2/2019 | Koponen | ............ H04L 41/0695 |
| 10,284,421 | B2* | 5/2019 | Pack | ..................... H04L 41/142 |
| 2015/0009804 | A1* | 1/2015 | Koponen | ............ H04L 41/0695 |
| | | | | 370/219 |
| 2015/0200859 | A1* | 7/2015 | Li | ........................ H04L 41/0823 |
| | | | | 370/235 |
| 2016/0050104 | A1 | 2/2016 | Wackerly et al. | |
| 2016/0088519 | A1 | 3/2016 | Hoffmann | |
| 2016/0164787 | A1 | 6/2016 | Roach et al. | |
| 2017/0373929 | A1* | 12/2017 | Pack | ..................... H04L 41/142 |
| 2019/0166013 | A1* | 5/2019 | Shaikh | ................... H04L 41/50 |
| 2019/0173744 | A1* | 6/2019 | Koponen | ............ H04L 41/0695 |

OTHER PUBLICATIONS

Zhihao Shang et al., "Design and Implementation of Server Cluster Dynamic Load Balancing Based on OpenFlow," 2011, pp. 691-696, Lanzhou University Communication Network Center, Lanzhou, China.

\* cited by examiner

MASTER CONTROLLER SELECTION IN A SOFTWARE DEFINED NETWORK

BACKGROUND

A software defined network (SDN) is based on a network architecture that decouples the control plane from the data plane. The control plane is implemented in an SDN controller and the data plane is implemented in the networking infrastructure (e.g., switches and routers). In software defined networking, data forwarding on a network device is controlled through flow table entries populated by the SDN controller that manages the control plane for that network. OpenFlow is a leading protocol for implementing software defined networking.

BRIEF DESCRIPTION OF THE DRAWINGS

For a better understanding of the solution, examples will now be described, purely by way of example, with reference to the accompanying drawings, in which.

DETAILED DESCRIPTION

Figure 1:
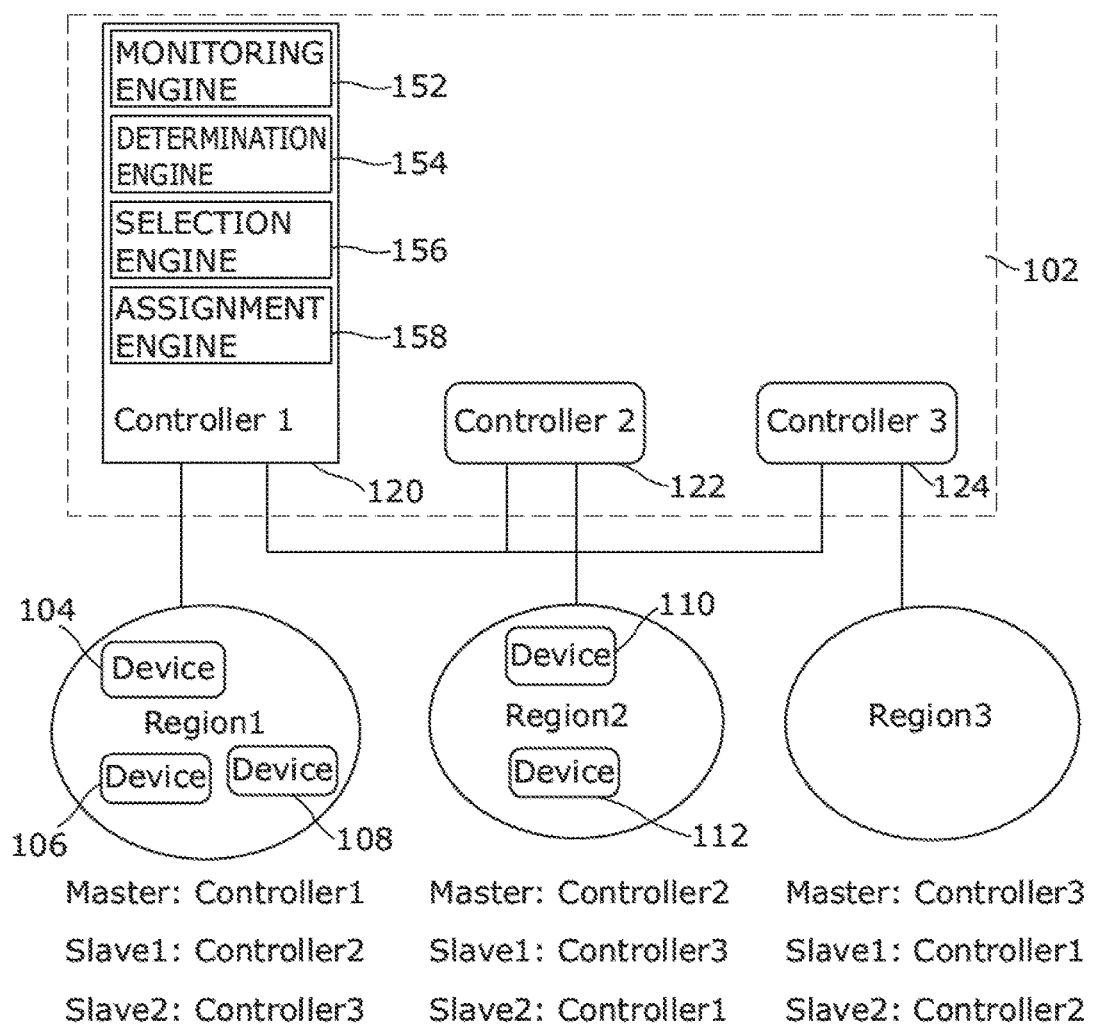
FIG. 1 illustrates a block diagram of an example computing environment for selecting a master controller in a software defined network.

Software defined networking (SDN) is an approach to networking in which control is decoupled from networking equipment and given to a device called a controller (or SDN controller). The controller is aware of all the devices and their points of interconnection in a SDN network and may perform various functions such as routing, policy implementation, receiving unknown flow packets, path resolution, flow programming, etc. Each new or missed flow through the network is routed via the controller that decides the network path for a flow and adds an entry for that flow in a flow table, in each of the network devices along the path. A SDN enabled device consults a flow table(s) for forwarding packets in the data plane. Each forwarding rule (flow entry) includes an action that dictates how traffic that matches the rule is to be handled.

OpenFlow is a leading protocol for implementing SDN architecture. An OpenFlow enabled network device (for example, a network switch) may include a flow table(s), which may perform packet lookups and forwarding. The switch may be managed by an external controller via the OpenFlow protocol.

Generally, a standalone controller may be used to manage OpenFlow enabled network devices in a SDN network. However, a standalone controller may be unable to provide high availability (HA), with the result that a controller failure may leave the SON network in an unmanaged state. Configuring a team of controllers and one or more corresponding controller regions may create a high availability network with fallover capability, resulting in a continuously managed network in the event that a controller in the team goes down.

A region may group network devices together with their controllers. A region may include three controllers which may be specified in a priority order for all network devices within the region. In an example, the three controllers in a team may be classified as master controller, primary slave controller, and secondary slave controller. Network devices in a region may be expressed as a list of individual IPv4 addresses, a list of IPv4 ranges, or a combination of both. Network devices included in a region may connect to the region's controllers. Network devices may be configured with the IPs of all three controllers in a team. This may allow one of those controllers to assert itself as the master of a given network device. The device may then automatically assign a role of slave to the other two configured controllers. This may ensure that the master knows of all the events happening on the device while the slaves may be kept up to date on a subset of events.

In a scenario, a role assertion may occur on network devices if the master controller goes down. The primary slave controller may assume the role of a master controller consequent to, for example, an unplanned event that may affect the functioning of a current master controller. Further to the assertion, the primary slave controller may assume the master's role over the network devices for which the failed controller was master. This may not be an ideal approach since it may not take into account the current state of the primary slave controller. For example, it does not take into account a current parameter (for example, current disk usage) related to the primary slave controller that may have a bearing on the primary slave controller's ability to manage network devices that may be transferred from the earlier master controller.

To address this issue, the present disclosure describes various examples for selecting a master controller in a software defined network (SDN). In an example, a master controller in a team of software defined network (SDN) controllers in an SDN network may monitor a parameter on the master controller and each of slave SDN controllers in the team. The master controller may perform a role of master over a group of network devices in the SON network. The master controller may rank the slave SDN controllers in the team based on respective values of the parameter on the slave SDN controllers. In response to a determination that a value of the parameter on the master controller is above a pre-defined limit, the master controller may select a slave SON controller having a lowest rank in the team. The master controller may then assign the role of master over network devices within the group to the selected slave SDN controller based on a ranking of the network devices. In an example, the network devices may be assigned in succession until a limit defined for a value of the parameter on the selected slave SDN controller is reached.

FIG. 1 illustrates a block diagram of an example computing environment 100 for selecting a master controller in a software defined network (SDN). The computing environment 100 may include a team of Software Defined Network (SDN) controllers 102 and network devices 104, 106, 108, 110, and 112. In an example, the team of SDN controllers may include three controllers 120, 122, and 124. Although five network devices 104, 106, 108, 110, and 112 are shown in FIG. 1, other examples of this disclosure may include more or less than five network devices. In an example, the computing environment 100 may be based on software-defined networking (SDN) architecture.

Each of the SDN controllers (for example, master controller) in the team 102 may be any server, computing device, or the like. In an example, each of the SDN controllers in the team 102 may be a computer application (machine-executable instructions). Each of the SDN controllers in the team 102 may define the data flow that occurs in computing environment 100. In other words, an SDN controller in the team 102 may determine how packets should flow through the network devices 104, 106, 108, 110, and 112 of the computing environment 100. An SDN controller in the team 102 may communicate with network devices 104, 106, 108, 110, and 112 via a standardized protocol (example, OpenFlow) or a suitable API.

Each of the SDN controllers in the team 102 may communicate with network devices 104, 106, 108, 110, and 112 over a computer network 130. The computer network 130 may be a wireless or wired network. The computer network 130 may include, for example, a Local Area Network (LAN), a Wireless Local Area Network (WAN), a Metropolitan Area Network (MAN), a Storage Area Network (SAN), a Campus Area Network (CAN), or the like. Further, the computer network 130 may be a public network (for example, the Internet) or a private network (for example, an intranet).

Network devices 104, 106, 108, 110, and 112 may each include, by way of non-limiting examples, a network switch, a network router, a virtual switch, and a virtual router. In an example, network devices 104, 106, 108, 110, and 112 may each be an SDN enabled device or an OpenFlow enabled device.

Network devices 104, 106, 108, 110, and 112 may each include one or more flow tables. Each flow table in a network device (for example, 104) may contain a flow entry (or flow entries). Network devices 104, 106, 108, 110, and 112 may each communicate with an SDN controller (for example, 120) via a standardized protocol such as OpenFlow. For instance, a network device (for example, 104) may forward the first packet of a flow to an SDN controller (for example, 120), enabling the controller to decide whether the flow should be added to a flow table in the network device.

Each controller belonging to the team 102 may be referred to as team member. To centralize team management and control, one controller may be elected by the team as the team leader. Teaming may be configured on one controller and automatically propagated to the other controllers in the team, regardless of which controller becomes the team leader. After a team is configured, any configuration changes may propagate to each controller.

Each controller in the team 102 may have its own IP address. In addition, a separate IP address, which may be referred to as the team IP address, may be used to represent the team as a whole. The team IP address may be active on the team leader.

Network devices 104, 106, 108, 110, and 112 may be grouped into one or more regions. A region groups network devices together with their controllers. A region may include three controllers which may be specified in priority order for all network devices within the region. In an example, the three controllers may be referred to as: "master controller", "primary slave controller", and "secondary slave controller". For example, referring to FIG. 1, network devices 104, 106, 108, 110, and 112 are grouped into three regions, wherein "Region 1" includes network devices 104, 106, and 108, and "Region 2" includes devices 110 and 112. "Region 3" may not include any network device.

A team of three controllers 120, 122, and 124 may be specified for each of the three regions (for example, Region 1, Region 2, and Region 3). For each region, one controller in the team may be specified as master controller. The remaining two controllers may be specified as primary slave controller and secondary slave controller. The master controller and the slave controllers may be different for each region.

Network devices (for example, 104, 106, and 108) in a region (for example, Region 1) may be expressed as a list of individual IPv4 addresses, a list of IPv4 ranges, or a combination of both. Devices included in a region may connect to the region's controllers (for example, 120, 122, and 124). Network devices in a region may be configured with the IPs of all three controllers in a team. This may allow one of those controllers to assert itself as the master of a given device. The device then may automatically assign a role of slave to the other two configured controllers. The master may know of all the events happening on the device while the slaves may be kept up to date on a subset of events.

Referring to FIG. 1, for network devices of Region 1, controller 120 may act as mater controller, and controllers 122 and 124 may be specified as primary slave controller and secondary slave controller, respectively. For network devices of Region 2, controller 122 may act as mater controller, and controllers 120 and 124 may be specified as primary slave controller and secondary slave controller, respectively. For network devices of Region 3, controller 124 may act as mater controller, and controllers 120 and 122 may be specified as primary slave controller and secondary slave controller, respectively.

In an example, at least one of the controllers in the team 102 may include a monitoring engine 152, a determination engine 154, a selection engine 156, and an assignment engine 158. In an example, such controller may act as master controller in the team. For the sake of simplicity in illustration, controller 120 is shown to include a monitoring engine 152, a determination engine 154, a selection engine 156, and an assignment engine 158. However, any of the other controllers in the team (for example, 122 and 124) may include these engines as well.

A controller (for example, 120, 122, and 124) may be implemented by at least one computing device and may include at least engines 152, 154, 156, and 158, which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of the controller (for example, 120, 122, and 124). In some examples, the at least one machine-readable storage medium may store instructions that, when executed by the at least one processing resource, at least partially implement some or all engines of the computing device. In such examples, the controller (for example, 120, 122, and 124) may include the at least one machine-readable storage medium storing the instructions and the at least one processing resource to execute the instructions.

As mentioned earlier, in an example, controller 120 may act as master controller in the team of controllers 102. Monitoring engine 152 on master controller 120 may monitor a parameter(s) on each controller (including controller 120) in the team of controllers 102. Thus, monitoring engine 152 may monitor a parameter on the master controller 120, primary slave controller 122, and secondary slave controller 124 of Region 1. Some non-limiting examples of the parameter that may be monitored by monitoring engine 152 may include: a processing resource usage in a controller, a memory usage in a controller, a disk space usage in a controller, a process on an OpenFlow interface of a controller, and a packet in/out on the OpenFlow interface of a controller. Monitoring engine 152 may monitor at least one of these parameters on master controller 120, primary slave controller 122, and secondary slave controller 124. In an example, the monitoring engine may monitor respective values determined for a parameter on the master controller 120, primary slave controller 122, and secondary slave controller 124. The respective values for a parameter may be determined by respective controllers (e.g., master controller 120, primary slave controller 122, and secondary slave controller 124). In an example, the value determined for a parameter may be stored in respective databases of the controllers (e.g., master controller 120, primary slave controller 122, and secondary slave controller 124). In an example, the data in respective databases may be synchronized. Thus, each controller in the team may include respective values of a parameter for the controllers in the team in its database. Monitoring engine 152 may refer to the database on controller 120 to analyze (for example, compare) the value of a parameter for each of the controllers in the team 102. Monitoring engine 152 may rank the slave controllers in the team based on respective values of the parameter on the slave SON controllers.

Determination engine 154 may determine whether a value of the parameter(s) for the master controller 120 is above a pre-defined limit. In an example, a user may define a pre-defined limit for a value of a parameter. In another example, the pre-defined limit may be system-defined. A pre-defined limit for a value of a parameter may vary among controllers of the team 102. For example, different values of a parameter may be defined for master controller 120, primary slave controller 122, and secondary slave controller 122. A pre-defined limit for a value of a parameter may be stored in respective databases of the controllers. These databases may be similar to those described earlier for storing the value of a parameter.

Figure 2:
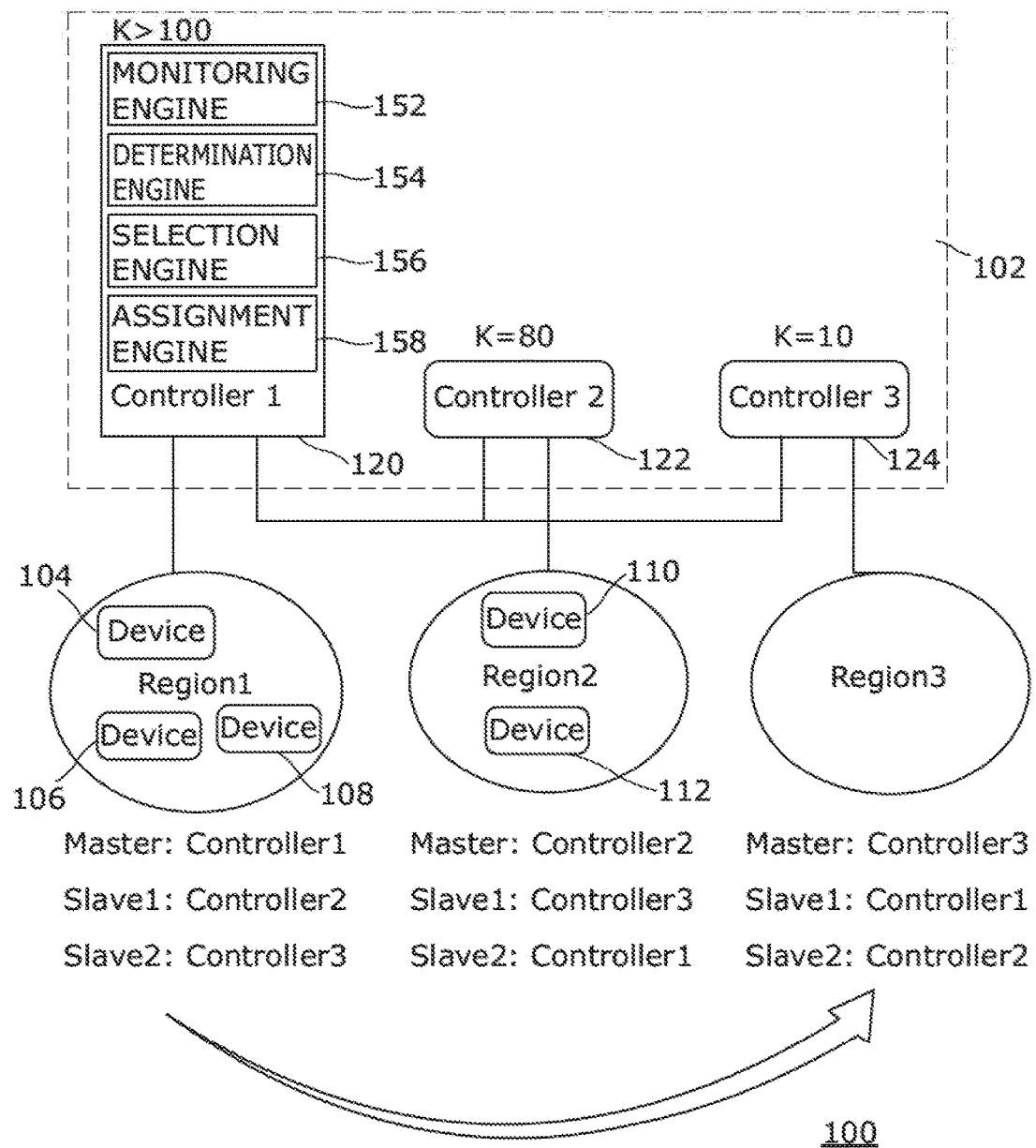
FIG. 2 illustrates a block diagram of an example computing environment for selecting a master controller in a software defined network (SDN)

In response to a determination that the value of the parameter(s) for the master controller 120 is above a pre-defined limit, selection engine may select a slave controller from the team as new master controller. The selected slave controller may be the primary slave controller or the secondary slave controller. The selection may be based on the respective values of the same parameter(s) for the primary slave controller and the secondary slave controller. In an example, a slave controller (e.g., primary slave controller or secondary slave controller) that has a lowest value of the parameter may be selected as new master controller. FIG. 2 illustrates an example wherein in response to a determination that the value of a parameter for the master controller 120 is above a pre-defined limit (e.g., K>100), selection engine 156 may select a slave controller from the team as new master controller. In this example, the value of the parameter (K=10) for slave controller S2 124 is less than the value of the parameter (K=80) identified for slave controller S1 (122). In this case, slave controller S2 (124) may be selected as new master controller.

In response to the selection of a new master controller in the team, assignment engine may assign the role of master over network devices in the group from the previous master controller 120 to the new master controller (for example, 122). Referring to the example in FIG. 2, the role of master over network devices (for example, 104, 106, and 108) may be transferred from the previous master controller 120 may be transferred to the new master controller S2 (124). In other words, network devices (for example, 104, 106, and 108) of a region for which the previous controller was the master controller may be transferred to the region of the new master controller. Referring to the example in FIG. 2, network devices of Region 1 may be transferred to Region 3 for which controller 124 may be the master controller.

Assignment engine 158 may assign the role of master over network devices from the previous master controller 120 to the new master controller (for example, 122) one at a time. The network devices may be assigned based on a respective value of a factor determined on each network device. In an example, the factor may include amount of traffic on an egress interface that is coupled to the previous master controller. In an example, monitoring engine may determine a value of the factor on each network device in the region under the control of a master controller. In response to the determination, assignment engine 158 may rank the network devices based on respective values of the factor determined on network devices. The network device with a highest amount of traffic on the egress interface may be given the highest ranking. Assignment engine 158 may transfer the network devices from the previous master controller to the new master controller based on the ranking of network devices beginning with a network device with the highest rank.

Figure 3:
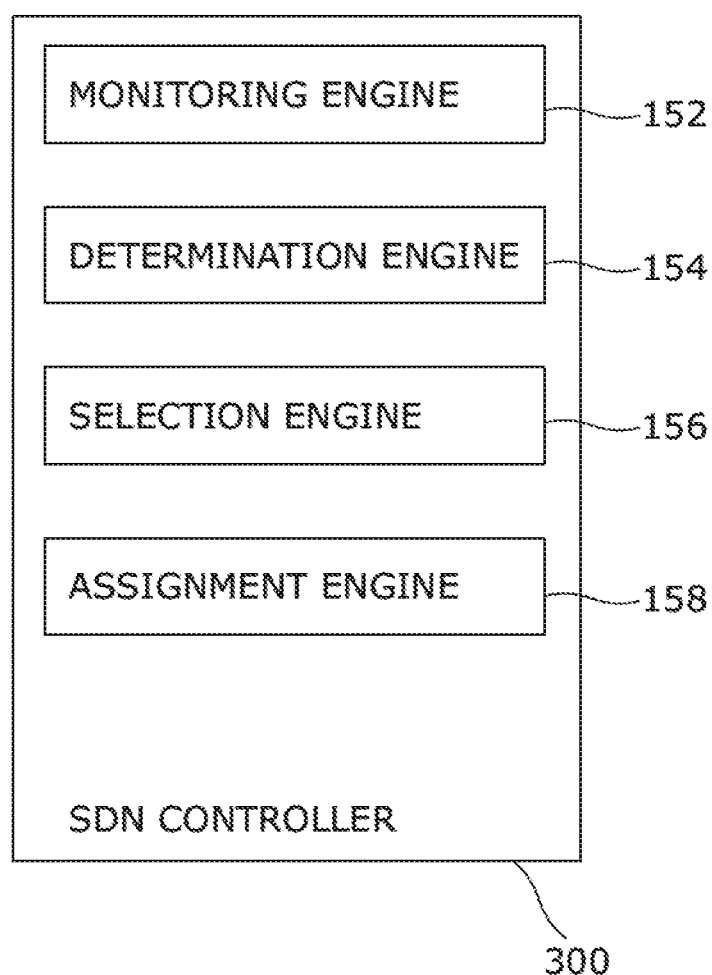
FIG. 3 is a bock diagram of an example SDN controller for selecting a master controller in a software defined network (SDN)

FIG. 3 is a block diagram of an example SDN controller 300 for selecting a master controller in a software defined network (SDN). In an example, SDN controller 300 may be analogous to SDN controllers 120, 122, and 122 of FIG. 1, in which like reference numerals correspond to the same or similar, though perhaps not identical, components. For the sake of brevity, components or reference numerals of FIG. 3 having a same or similarly described function in FIG. 1 or 2 are not being described in connection with FIG. 3. Said components or reference numerals may be considered alike.

SDN controller 300 may be any server, computing device, or the like. In an example, SDN controller 300 may be a computer application (machine-executable instructions).

In an example, SDN controller 300 may be a member of a team of controllers in a SDN network. In an example, SDN controller may be a master controller in a team of SDN controllers.

SDN controller 300 may include a monitoring engine 152, a determination engine 154, a selection engine 156, and an assignment engine 158. In an example, monitoring engine 152 may monitor a parameter for each SDN controller in a team of SDN controllers in an SDN network, wherein SDN controller 300 is a master controller in the team of SDN controllers. Determination engine 154 may determine whether a value of the parameter for SDN controller 300 is above a pre-defined limit. In response to a determination that the value of the parameter for SDN controller 300 is above a pre-defined limit, selection engine 156 may select a slave controller from the team as new master controller. In an example, selection engine may select a slave controller with the lowest value of the parameter as new master controller. Assignment engine 158 may assign network devices under control of SDN controller 300 to the new master controller. In an example, the transfer may be based on respective values of a factor on the network devices. In an example, the factor may include amount of traffic on an egress interface that is coupled to the previous master controller. In an example, the network devices may be assigned in succession until a limit defined for a value of the parameter on the selected SDN controller is reached.

Figure 4:
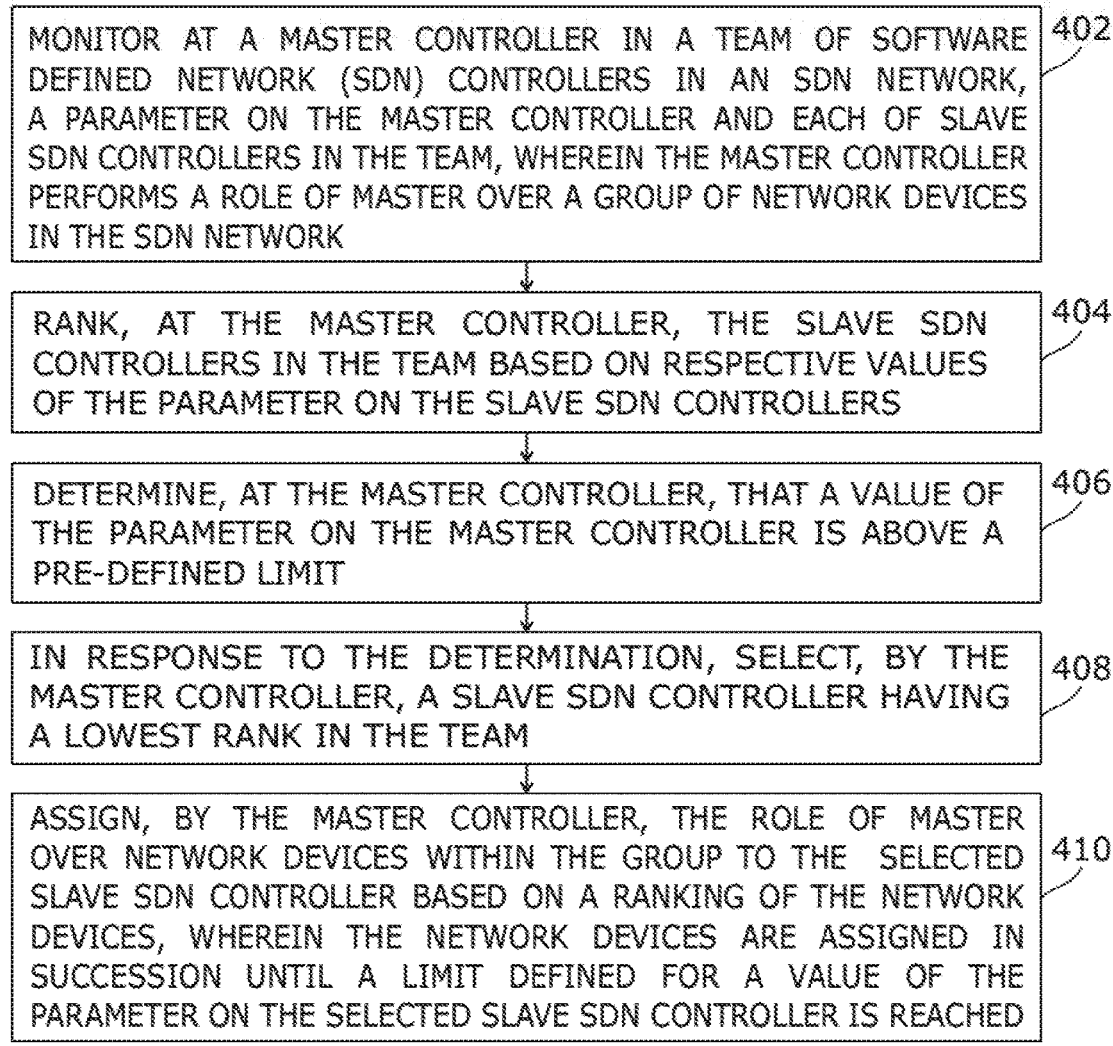
FIG. 4 is a flow chart of an example method of selecting a master controller in a software defined network (SDN)

FIG. 4 is a block diagram of an example method 400 for selecting a master controller in a software defined network (SDN). The method 400, which is described below, may be partially executed on a computing device such as SDN controllers 120, 122, and 122 of FIG. 1. However, other suitable computing devices may execute method 400 as well. At block 402, a master controller in a team of software defined network (SDN) controllers in an SDN network may monitor a parameter on the master controller and each of slave SDN controllers in the team. The master controller performs a role of master over a group of network devices in the SDN network. At block 404, the master controller may rank the slave SDN controllers in the team based on respective values of the parameter on the slave SDN controllers. At block 406, the master controller may determine that a value of the parameter on the master controller is above a pre-defined limit. At block 408, in response to the determination, the master controller may select a slave SDN controller having a lowest rank in the team. At block 410, the master controller may assign the role of master over network devices within the group to the selected slave SDN controller based on a ranking of the network devices. In an example, the network devices may be assigned in succession until a limit defined for a value of the parameter on the selected slave SDN controller is reached.

In an example, further to the assignment at block 408, a determination may be made whether the value of the parameter for the master controller is within the pre-defined limit. In response to the determination that the value of the parameter for the master controller is within the pre-defined limit, the role of master over the network devices may be reassigned from the new master controller to the master controller.

Figure 5:
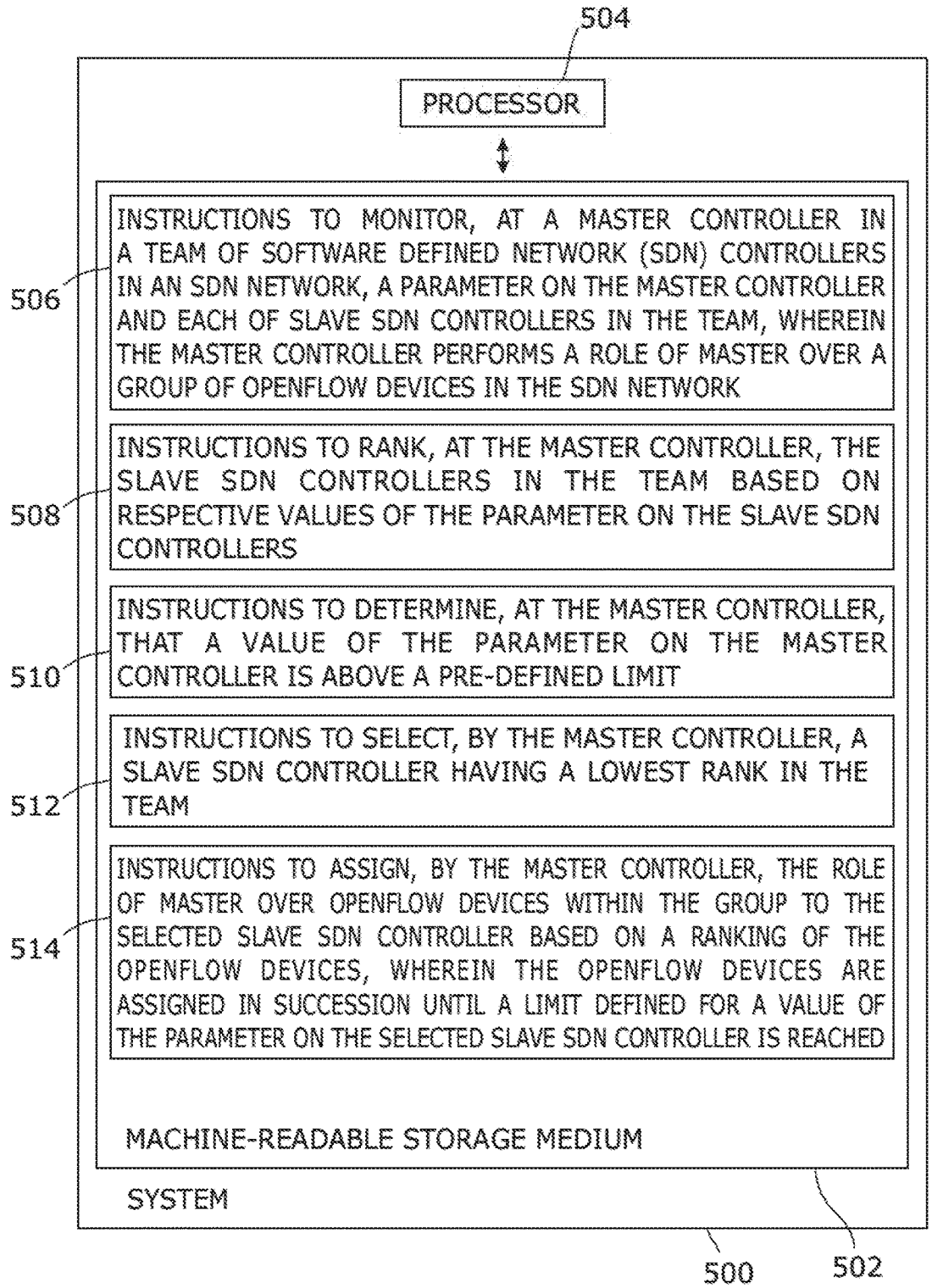
FIG. 5 is a block diagram of an example system for selecting a master controller in a software defined network (SDN).

FIG. 5 is a block diagram of an example system 500 for selecting a master controller in a software defined network (SDN). System 500 includes a processor 502 and a machine-readable storage medium 504 communicatively coupled through a system bus. In an example, system 500 may be analogous to SDN controllers 120, 122, and 122 of FIG. 1. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 504 may store instructions 506, 508, 510, 512, and 514. In an example, instructions 506 may be executed by processor 502 to monitor, at a master controller in a team of software defined network (SDN) controllers in an SDN network, a parameter on the master controller and each of slave SDN controllers in the team. The master controller may perform a role of master over a group of OpenFlow devices in the SON network. Instructions 508 may be executed by processor 502 to rank, at the master controller, the slave SDN controllers in the team based on respective values of the parameter on the slave SDN controllers. Instructions 510 may be executed by processor 502 to determine, at the master controller, that a value of the parameter on the master controller is above a pre-defined limit. In response to the determination, instructions 512 may be executed by processor 502 to select, by the master controller, a slave SDN controller having a lowest rank in the team. Instructions 514 may be executed by processor 502 to assign, by the master controller, the role of master over OpenFlow devices within the group to the selected slave SDN controller based on a ranking of the OpenFlow devices. In an example, the OpenFlow devices may be assigned in succession until a limit defined for a value of the parameter on the selected slave SDN controller is reached.

For the purpose of simplicity of explanation, the example method of FIG. 4 is shown as executing serially, however it is to be understood and appreciated that the present and other examples are not limited by the illustrated order. The example systems of FIGS. 1, 2, 3, and 5, and method of FIG. 4 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the stages of any method or process so disclosed, may be combined in any combination, except combinations where at least some of such features and/or stages are mutually exclusive.

The invention claimed is:

1. A method, comprising:
monitoring, at a master controller in a team of software defined network (SDN) controllers in an SDN network, a parameter on the master controller and each of slave SDN controllers in the team, wherein the master controller performs a role of master over a group of network devices in the SDN network;
ranking, at the master controller, the slave SDN controllers in the team based on respective values of the parameter on the slave SDN controllers;
determining, at the master controller, that a value of the parameter on the master controller is above a pre-defined limit;

in response to the determination, selecting, by the master controller, a slave SDN controller having a lowest rank in the team; and assigning, by the master controller, the role of master over network devices within the group to the selected slave SDN controller based on a ranking of the network devices, wherein the network devices are assigned in succession until a limit defined for a value of the parameter on the selected slave SDN controller is reached;

wherein the network devices are ranked based on respective values of a factor on the network devices.

2. The method of claim 1, wherein the factor includes amount of traffic on an egress interface coupled to the master controller.

3. The method of claim 1, wherein the parameter includes at least one of: a processing resource usage, a memory usage, and a disk space usage.

4. The method of claim 1, wherein the selected slave SDN controller performs a role of slave controller over the group of network devices prior to the selection.

5. A software defined network (SDN) controller, comprising:
a processor and a memory including instructions that when executed causes the SDN controller to:
monitor a parameter on each SDN controller in a team of SDN controllers comprising the SDN controller, wherein the SDN controller performs a role of master over a group of network devices;
determine that a value of the parameter on the SDN controller is above a pre-defined limit;
in response to the determination, select another SDN controller from the team, wherein the selected SDN controller has a lowest value of the parameter; and
assign the role of master over network devices in the group to the selected SDN controller based on a ranking of the network devices, wherein the network devices are assigned in succession until a limit defined for a value of the parameter on the selected SDN controller is reached;
a database that stores a value of the parameter on each SDN controller in the team of SDN controllers.

6. The SDN controller of claim 5, wherein the parameter includes at least one of: a process on an OpenFlow interface, and a number of packets in/out on the OpenFlow interface.

7. The SDN controller of claim 5, wherein the network devices are ranked based on respective amount of traffic on an egress interface of the network devices that is coupled to the master controller.

8. The SON controller of claim 5, wherein the network devices are OpenFlow enabled devices.

9. A non-transitory machine-readable storage medium comprising instructions, the instructions executable by a processor to:

monitor, at a master controller in a team of software defined network (SDN) controllers in an SDN network, a parameter on the master controller and each of slave SDN controllers in the team, wherein the master controller performs a role of master over a group of OpenFlow devices in the SDN network;

rank, at the master controller, the slave SDN controllers in the team based on respective values of the parameter on the slave SDN controllers;

determine, at the master controller, that a value of the parameter on the master controller is above a pre-defined limit;

in response to the determination, select, by the master controller, a slave SDN controller having a lowest rank in the team;

assign, by the master controller, the role of master over OpenFlow devices within the group to the selected slave SDN controller based on a ranking of the OpenFlow devices, wherein the OpenFlow devices are assigned in succession until a limit defined for a value of the parameter on the selected slave SDN controller is reached; and monitor a database on the master controller that stores the value of the parameter on the master controller and respective values of the parameter on the slave SDN controllers.

10. The storage medium of claim 9, wherein the instructions to monitor comprise instructions to:
synchronize the database on the master controller with respective databases on the slave SDN controllers, wherein the respective databases on the slave SDN controllers store respective values of the parameter on the slave SDN controllers.

11. The storage medium of claim 9, wherein the selected slave SDN controller is one of a primary slave controller and a secondary slave controller for the group of OpenFlow devices prior to the selection.

12. The storage medium of claim 9, wherein the instructions to assign comprise instructions to:
determine amount of traffic on an egress interface of each OpenFlow device in the group of OpenFlow devices, wherein the egress interface is coupled to the master controller;
rank the OpenFlow devices based on respective amount of traffic on the egress interface of the OpenFlow devices, wherein an OpenFlow device with a highest amount of traffic on the egress interface is given a highest ranking; and
assign the role of master over each of the OpenFlow devices in succession beginning with the OpenFlow device with the highest amount of traffic on the egress interface.

* * * * *